US009803819B2

(12) United States Patent
Sciascia et al.

(10) Patent No.: US 9,803,819 B2
(45) Date of Patent: Oct. 31, 2017

(54) COMPOSITE TRANSPARENT LIGHTING DEVICE

(71) Applicant: SAES GETTERS S.P.A., Lainate (IT)

(72) Inventors: Calogero Sciascia, Paicenza (IT); Alessio Corazza, Como (IT); Corrado Carretti, Milan (IT)

(73) Assignee: SAES GETTERS S.P.A., Lainate (IT)

( * ) Notice: Subject to any disclaimer, the term of this patent is extended or adjusted under 35 U.S.C. 154(b) by 196 days.

(21) Appl. No.: 14/786,137

(22) PCT Filed: May 9, 2014

(86) PCT No.: PCT/IB2014/061318
§ 371 (c)(1),
(2) Date: Oct. 21, 2015

(87) PCT Pub. No.: WO2014/181296
PCT Pub. Date: Nov. 13, 2014

(65) Prior Publication Data
US 2016/0084459 A1 Mar. 24, 2016

(30) Foreign Application Priority Data
May 10, 2013 (IT) .............................. MI2013A0774

(51) Int. Cl.
F21S 19/00 (2006.01)
E06B 3/663 (2006.01)
(Continued)

(52) U.S. Cl.
CPC ........ *F21S 19/005* (2013.01); *E06B 3/66376* (2013.01); *F21V 33/006* (2013.01);
(Continued)

(58) Field of Classification Search
CPC .. F21S 19/005; E06B 3/66376; F21V 33/006; G02B 5/0242; G02B 5/0278;
(Continued)

(56) References Cited

U.S. PATENT DOCUMENTS 8,237,352 B2 8/2012 Sohn et al.
2015/0378216 A1* 12/2015 Oh .................... G02F 1/133609
349/69

FOREIGN PATENT DOCUMENTS

JP 2012 089290 5/2012
WO 2007/140347 12/2007
(Continued)

OTHER PUBLICATIONS

Nahida, J.H. "Spectrophotometric Analysis for the UV-Irradiated (PMMA)" *International Journal of Basic & Applied Sciences*, vol. 12, No. 2 (2012) 58-67.
(Continued)

Primary Examiner — Laura Tso
(74) Attorney, Agent, or Firm — Steinfl + Bruno LLP

(57) ABSTRACT

A composite transparent lighting device is described. The device has a transparent substrate, an uniform distribution of low concentration dielectric particles, reflective perimeter and perimetral discrete light sources, of improved appearance both in the inoperative state of the device, and at the same time capable of providing good quality lighting when the device is active, i.e. when the discrete light sources on the perimeter of the device are turned on.

11 Claims, 4 Drawing Sheets

Figure 1:
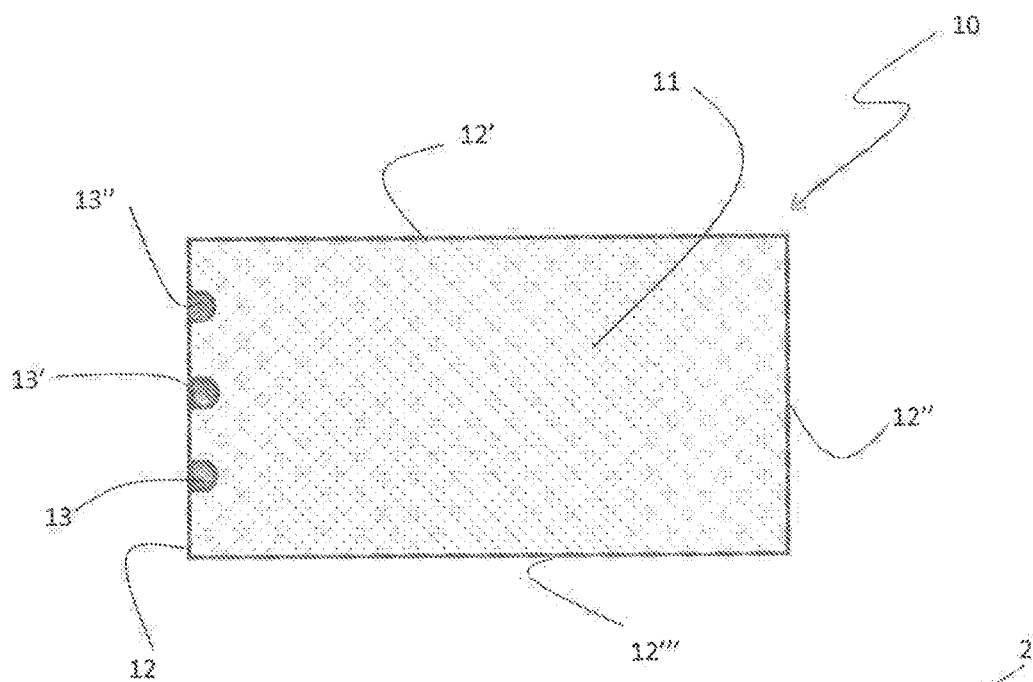

(51) Int. Cl.
  *G02B 5/02* (2006.01)
  *F21V 8/00* (2006.01)
  *F21V 33/00* (2006.01)
  *F21Y 105/00* (2016.01)
  *F21Y 115/15* (2016.01)
  *F21Y 115/10* (2016.01)

(52) U.S. Cl.
  CPC ......... *G02B 5/0242* (2013.01); *G02B 5/0278* (2013.01); *G02B 6/0031* (2013.01); *G02B 6/0041* (2013.01); *G02B 6/0095* (2013.01); *F21Y 2105/00* (2013.01); *F21Y 2115/10* (2016.08); *F21Y 2115/15* (2016.08); *G02B 6/0021* (2013.01)

(58) Field of Classification Search
  CPC .. G02B 6/0031; G02B 6/0041; G02B 6/0095; G02B 6/0021; F21Y 2115/10; F21Y 2115/15; F21Y 2105/00

USPC ........................................................ 362/609
  See application file for complete search history.

(56) References Cited

FOREIGN PATENT DOCUMENTS

| WO | 2009/040724 | 4/2009 |
| WO | 2011/030284 | 3/2011 |
| WO | 2012/041480 | 4/2012 |

OTHER PUBLICATIONS

PCT International Search Report dated Jul. 4, 2014 for PCT/IB2014/061318 filed on May 9, 2014 in the name of SAES GETTERS S.P.A.s.

PCT Written Opinion dated Jul. 4, 2014 for PCT/IB2014/061318 filed on May 9, 2014 in the name of SAES GETTERS S.P.A.s.

\* cited by examiner

COMPOSITE TRANSPARENT LIGHTING DEVICE

CROSS REFERENCE TO RELATED APPLICATIONS

The present application is the U.S. national stage entry of International Patent Application No. PCT/IB2014/061318, filed internationally on May 9, 2014 which, in turn, claims priority to Italian Patent Application No. MI2013A000774, filed on May 10, 2013.

The present invention is inherent to a composite transparent lighting device.

In the recent years there have been some activities to improve appearance and characteristics of transparent elements imparting to them additional properties and altering their original function from passive elements to active devices.

For example in case of building windows, some activities have been carried out to make the transparent element a source of ambient illumination during night-time, such as described in the international patent application WO 2009/040724. In this case the technical effect is achieved by interposing an organic light emitting element in the incoming solar radiation path; such solution is complex, expensive and cannot avoid to negatively impact the window transparency unless very expensive materials and processes are used.

Other solutions are described in the international patent applications WO 2012/041480 and WO 2007/047684. In these cases, in order to obtain a luminous output, perimeter light sources coupled with scattering particles being denser in the central part of the window have been described. Such concentration gradient have the drawback in affecting the window transparency and uniformity.

U.S. Pat. No. 8,237,352 shows a photo-luminescent sheet to be coupled with LEDs lights having a uniform phosphor content at high concentration, and does not address the problem of transparency of the sheet.

Purpose of the present invention is to overcome the drawbacks still present in the known art by providing a composite transparent lighting device that is uniformly transparent during day-time and capable at the same time of becoming a uniform light source of excellent quality during night-time (i.e. when turned on).

These effects are achieved by means of the present invention that in a first aspect thereof consists in a composite transparent lighting device comprising a transparent element with discrete light sources optically coupled with the transparent element perimeter, a reflective frame defining the boundaries of the composite transparent lighting device. Said reflective frame covers at least 80% of the composite transparent lighting device perimeter. The transparent element is characterized in that:

a. said transparent element comprises a transparent matrix with a uniform dispersion of dielectric particles, b. said transparent matrix has an optical light extinction coefficient equal to or less than 0.009 cm$^{-1}$, evaluated at 500 nm, and c. the volume concentration of said dielectric particles is comprised between:

$$c_{Max}\left[\frac{Vol}{Vol}\right] =$$

$$\begin{cases} 6 \cdot 10^{-11.2} \cdot \left[\rho^3 \left(\frac{m^2-1}{m^2+2}\right)^2\right]^{-1} & \text{if } 10^{-13} \leq \rho^6 \left(\frac{m^2-1}{m^2+2}\right)^2 < 10^{-7} \\ 10^{-5.3} \cdot \rho & \text{if } 10^{-7} \leq \rho^6 \left(\frac{m^2-1}{m^2+2}\right)^2 < 10^{10} \end{cases}$$

and $$c_{Min}\left[\frac{Vol}{Vol}\right] =$$

$$\begin{cases} 6 \cdot 10^{-12.8} \cdot \left[\rho^3 \left(\frac{m^2-1}{m^2+2}\right)^2\right]^{-1} & \text{if } 10^{-13} \leq \rho^6 \left(\frac{m^2-1}{m^2+2}\right)^2 < 10^{-7} \\ 10^{-6.7} \cdot \rho & \text{if } 10^{-7} \leq \rho^6 \left(\frac{m^2-1}{m^2+2}\right)^2 < 10^{10} \end{cases}$$

where $\rho$ is the average dielectric particle size expressed in µm, and m is the ratio between the refractive index of the dielectric particles and the refractive index of the transparent matrix evaluated at 500 nm.

Preferably the composite transparent lighting device has the dielectric particle volume concentration comprised:
between $10^{-6}$ and $10^{-5}$ if 20 µm>$\rho\geq$5 µm,
between $10^{-6}$ and $10^{-5}$ if 1 µm>$\rho$>0.3 µm or
between $10^{-4.5}$ and $10^1$ if 0.1 µm>$\rho$>0.04 µm.

Figure 2:
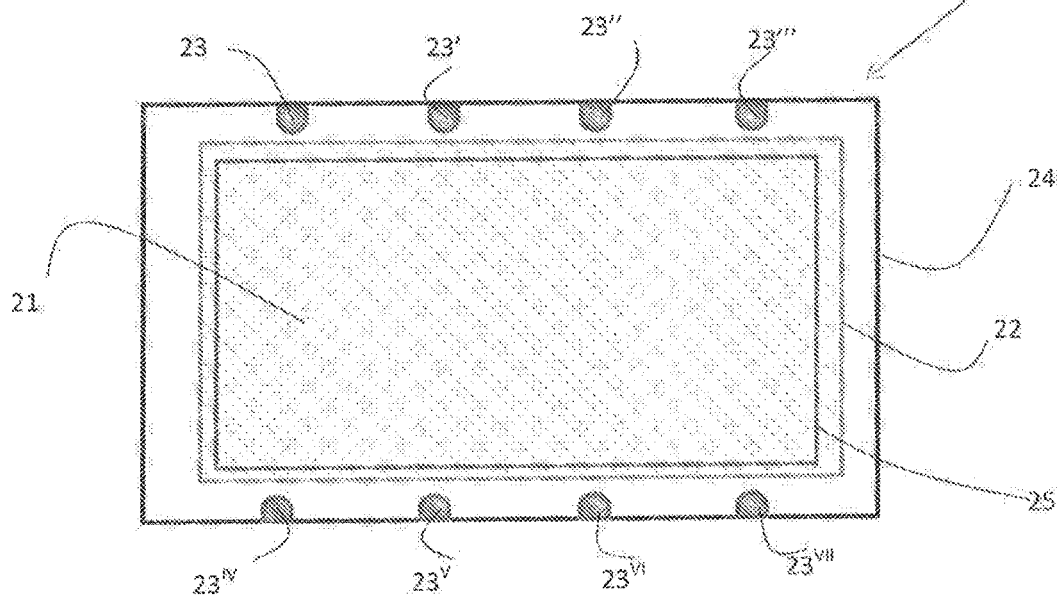

The invention will be further illustrated by means of the following figures where:

FIG. 1 is a schematic representation of a view from above of a composite transparent lighting device according to the present invention, FIG. 2 is a schematic representation of a view from above of an alternate embodiment of a transparent lighting device according to the present invention.

Figure 3:
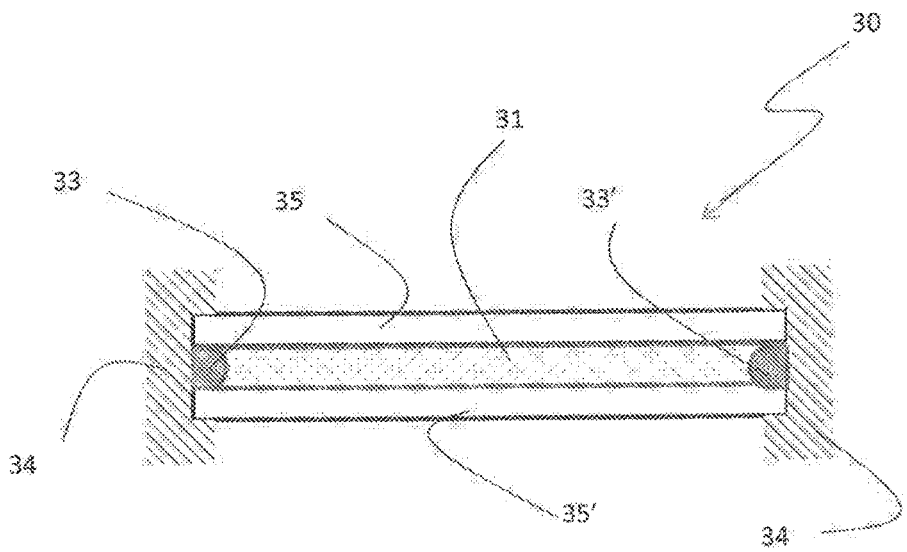
Figure 4:
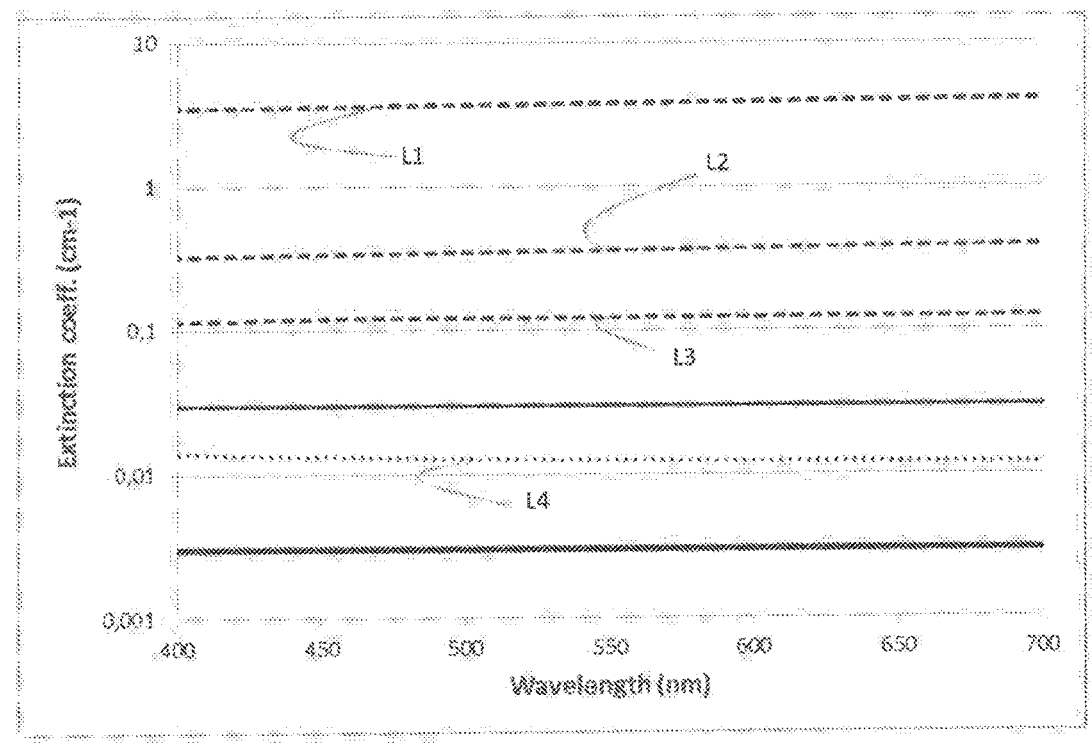
Figure 5:
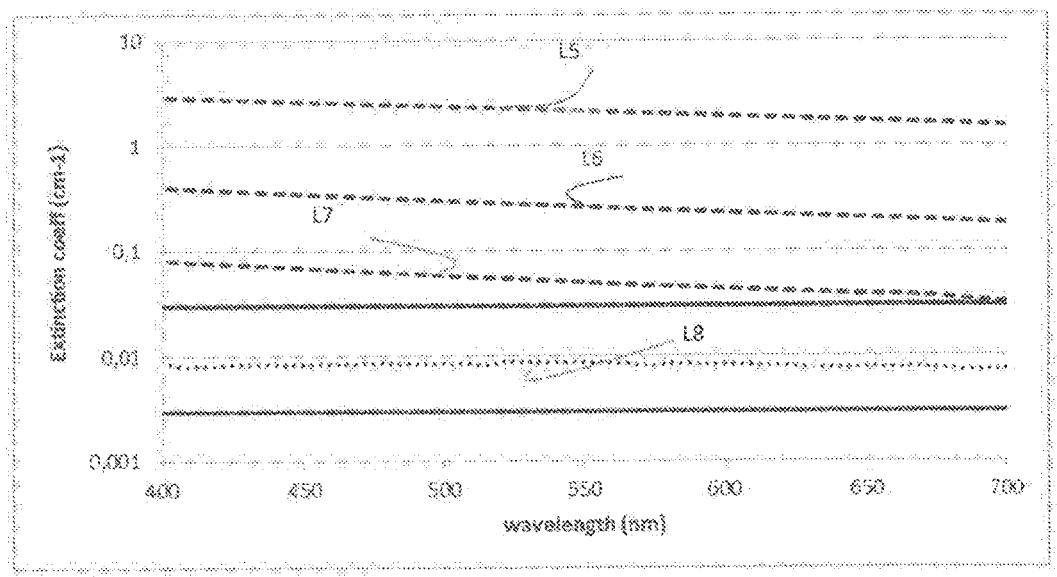
Figure 6:
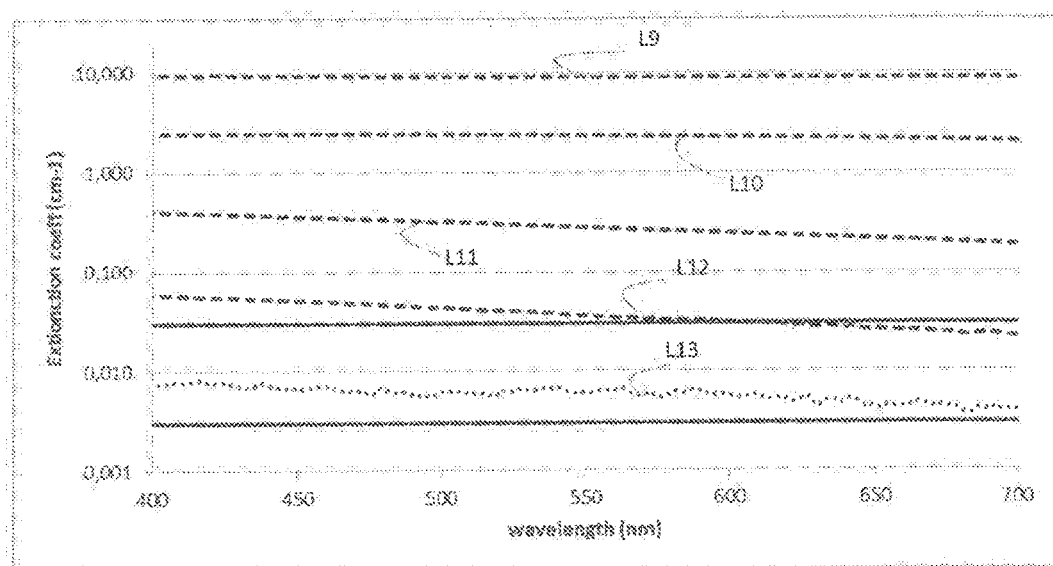
Figure 7:
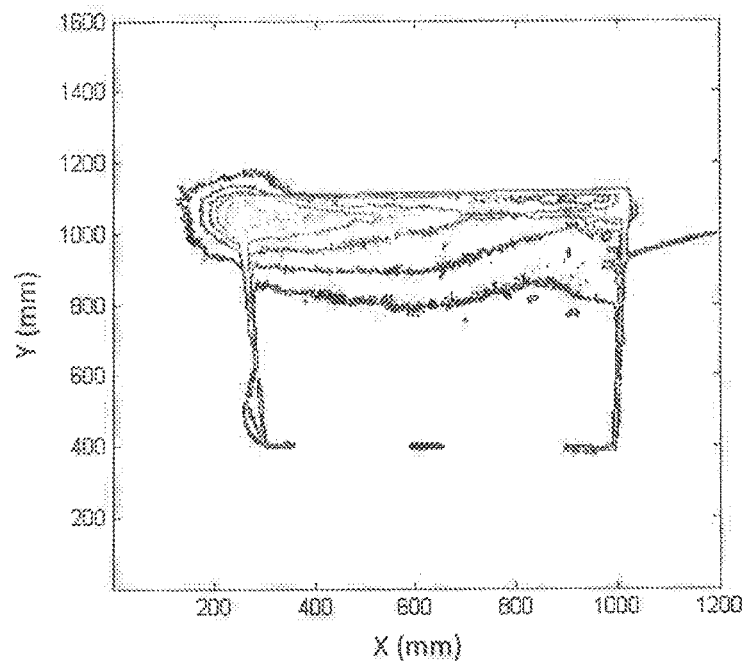
Figure 8:
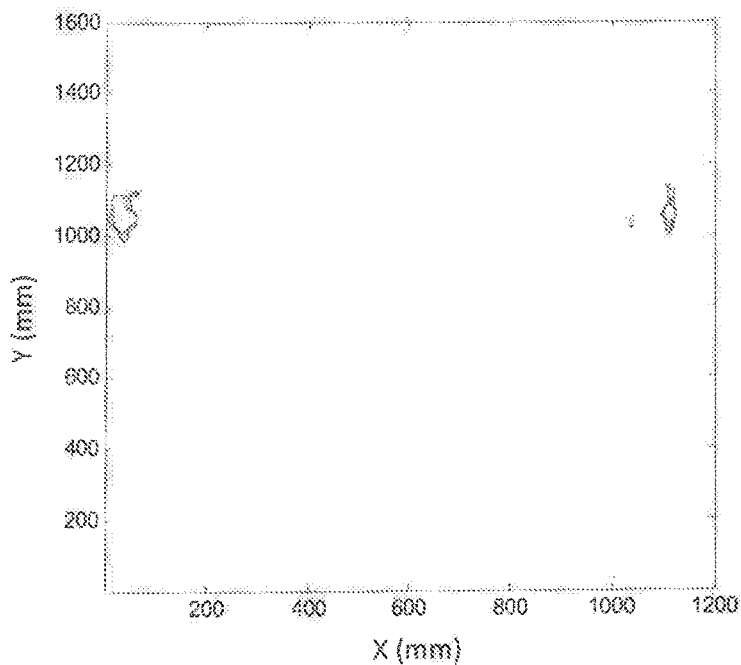

FIG. 3 is a schematic view of a cross section of another alternate embodiment of a composite transparent lighting device according to the present invention, FIG. 4-6 show experimental data collected on the extinction coefficient variation over the visible spectrum, with three different types of material powders and with varying sample concentration loading, FIG. 7 shows the representation of a recording of a CCD camera for a transparent subassembly made according to the present invention, and FIG. 8 shows the representation of a recording of a CCD camera for a transparent subassembly not made according to the present invention.

In the figures the auxiliary elements not necessary for the illustration of the inventive concept will be omitted, for example with reference to FIGS. 1-3, the discrete light source power supply, switch and controller are not shown. Also some features have been magnified to improve the figure understanding, with particular and non-exclusive reference to the size of the dielectric particles of FIGS. 1 and 2, that are cardinal components of the present invention related to their scattering properties optionally in combination with luminescence.

The inventors have found a set of features necessary to have an improved appearance of a lighting device also in its inoperative state, when its transparency is exploited for example in building windows, internal wall separators, lamps, and at the same time capable of providing good quality lighting when active, i.e. when the discrete light sources on its perimeter are turned on. With good quality lighting it is meant that light is pleasantly diffused, without visible glares or light sparkles.

Such features are a uniform distribution of low concentration of dielectric particles coupled with the use of a reflecting frame to direct and redirect via multiple reflections the light out of the panel. Such features and their combination are not disclosed in the known art.

With uniform distribution of dielectric particles it is intended that in any point of the transparent lighting element containing the dielectric particles the number of particles within a $10^{-2}$ cm$^3$ volume (with the condition that all the volume is encompassed in such constituting element) is equal or differs by less than 10% with respect to the average value in the panel. In practice a simple way to verify this condition is to verify that the difference between the concentration in the central part of the lighting element and a periphery volume is equal to or less than 10%. The above definition takes also into account that the lighting constituting element containing the scattering particles may present a discontinuity (absence of dielectric particles) close to the edges of the lighting device and/or in the immediate whereabouts of the discrete light sources.

Typically such periphery areas, when present, are up to 3 cm from the lighting device borders.

The composite transparent lighting device according to the present invention comprises a transparent element, with transparent element material it is intended a material whose optical light extinction coefficient $\alpha$ is equal to or less than 0.009 cm$^{-1}$ evaluated at 500 nm.

With such coefficient $\alpha$ defined as $$\alpha = -\frac{1}{d} * \ln\left(\frac{T}{100}\right)$$

and $$T = 100 * \frac{Iout}{Iin} + R$$

$$R = 100 * \frac{Iback}{Iin}$$

where:
 d is the transparent element thickness
 Iin and Iout are respectively the incident light intensity and light intensity after having passed through the transparent element,
 Iback is the light reflected by the surface exposed to the incident light,
 T is the transmittance and R is the reflectance.

Preferred transparent materials for use in the present invention are glass, polymeric materials such as poly-methyl methacrylate (PMMA), poly-carbonate (PC), poly-siloxane resins, acrylic, epoxy resins and poly-vinyl butyral (PVB). These materials may be used alone or in combination with a transparent substrate, i.e. a thin layer of a transparent element (for example a PMMA layer containing a dispersion of dielectric particles) could be deposited over a glass substrate. Preferred transparent substrate thicknesses are comprised between 0.1 and 6 mm.

The dielectric particles concentration for a composite transparent lighting device according to the present invention should be low, meaning that the particles give an increase in the optical light extinction value by an amount comprised between 0.003 cm$^{-1}$ and 0.03 cm$^{-1}$.

This corresponds to dielectric particle volume concentration values (volume of the particles with respect to volume of the matrix) comprised between:

$$c_{Max}\left[\frac{Vol}{Vol}\right] =$$

$$\begin{cases} 6 \cdot 10^{-11.2} \cdot \left[\rho^3\left(\frac{m^2-1}{m^2+2}\right)^2\right]^{-1} & \text{if } 10^{-13} \leq \rho^6\left(\frac{m^2-1}{m^2+2}\right)^2 < 10^{-7} \\ 10^{-5.3} \cdot \rho & \text{if } 10^{-7} \leq \rho^6\left(\frac{m^2-1}{m^2+2}\right)^2 < 10^{10} \end{cases}$$

and $$c_{Min}\left[\frac{Vol}{Vol}\right] =$$

$$\begin{cases} 6 \cdot 10^{-12.8} \cdot \left[\rho^3\left(\frac{m^2-1}{m^2+2}\right)^2\right]^{-1} & \text{if } 10^{-13} \leq \rho^6\left(\frac{m^2-1}{m^2+2}\right)^2 < 10^{-7} \\ 10^{-6.7} \cdot \rho & \text{if } 10^{-7} \leq \rho^6\left(\frac{m^2-1}{m^2+2}\right)^2 < 10^{10} \end{cases}$$

where $\rho$ is the average dielectric particle size expressed in µm, and m is the ratio between the refractive index of the dielectric particles and the refractive index of the transparent matrix evaluated at 500 nm.

Even more preferred is the use of a volume concentration for the dielectric particles concentration comprised:
 between $10^{-6} \div 10^{-5}$ for 20 µm>$\rho$≥5 µm, in order to obtain a light scattering independent from radiation wavelengths;
 between $10^{-6} \div 10^{-5}$ for 1 µm>$\rho$>0.3 µm in order to assure a high uniformity of the extracted light along the panel;
 between $10^{-4.5} \div 10^{-3}$ for 0.1 µm>$\rho$>0.04 µm when m is comprised between 0.933 and 1.067 (with m≠1±0.007) in order to achieve the maximum of extracted light preserving a good transparency.

It is important to underline that the scattering particles may not have a spherical shape, and also that the particles will present a size distribution, so in the above formula $\rho$ refers to the average radius of the particles, or in case of irregular shapes, to the average of the particles half-widths (that for each particle is given by the sum by the maximum size and the minimum size divided by 4). This takes also into account that different types of particles may be present, each characterized by its own size distribution.

In this regards, if more particles and/or different size distributions are present, the maximum concentration of each constituent should not exceed the Cmax given in the formula. In particular the above Cmin and Cmax limits for each constituent should be proportionally adjusted according with the relative concentration of the specific constituent with respect to the total volume of dielectric particles. For example, if it is present 40% vol/vol of scattering particle A and 60% of scattering particle B, the maximum and minimum concentration with respect to the matrix are given by the above formula corrected by a multiplying factor of 0.4 for scatterer A and 0.6 for scatterer B.

Examples of suitable materials for the dielectric particles are: metallic oxides, in this case preferred are oxides of Ti, Al, Zr, Hf, Ta, Y, Yb; silicates, in this case preferred are aluminosilicates, $SiO_2$, glass beads; white and transparent ceramic beads; white and transparent plastic beads; barium sulfate.

The thickness of the matrix containing the uniform dispersion of dielectric particles is preferably comprised between 0.1 and 6 mm.

Another class of materials suitable to be used as dielectric particles in the composite transparent lighting device according to the present invention are inorganic phosphors such as Ce:YAG; orthosilicates, aluminosilicates, nitrides, oxynitrides doped with Europium, etc.

In an alternative embodiment of the present invention the transparent element further contains a dispersion of luminescent dyes in concentration comprised between $10^{-6}$ and $10^{-9}$ mol/L. Examples of suitable luminescent dyes are: organic molecules as bipyridine derivate, coumarin, dicarbocyanine derivate, lactone, oxazine 720, naphthalimide derivate, phthalocyanine, hematoporphyrin, pyrromethene, thioxanthene, sulfoRhodamine, Rhodamine 6G, perylene derivatives, derivate of (iso)violanthrone; inorganic Quantum Dots (CuInS, ZnSe, ZnS, InP, CuInZnS etc.) or nanophosphors.

According to the present invention, the composite lighting element perimeter presents an average reflectivity equal to or higher than 80%, this takes into account both the fact that a 100% reflectivity is an ideal value (even though materials with a reflectivity higher than 90% may be easily identified by a person skilled in the art being them rather conventional), as well as the fact that some portions of the perimeter of the device may not be reflective, for examples the portions in correspondence to the discrete light sources. The reflective frame may be given by a variety of equivalent solutions such as metal guides, deposition of metallic layers or films, high reflectance paintings or coatings.

Example of discrete light sources useful to be adopted in the present invention are conventional LEDs, preferred is the use of blue or white LEDs, laser diodes, organic light emitting transistors (OLETs) or organic light emitting diodes (OLEDs). Those are preferably disposed on at least two sides of the composite transparent lighting device, and their number is such that the provided power is comprised between 5 and 18 W per meter of length along the device perimeter. Preferably such discrete light sources provide a total light output comprised between 2000 and 5000 lumen per each square meter of composite transparent lighting device surface.

FIG. 1 shows a schematic view from above of a first embodiment of a composite transparent lighting device 10. In this case a set of discrete light sources 13, 13', 13", is inserted in the transparent element that contains the uniform dispersion of dielectric particles 11. The four sides 12, 12', 12", 12''' of the composite transparent lighting device 10 are made reflective, for example by depositing a thin metal layer. In this case it is preferred for the discrete light sources to fit into the transparent element 11 for a length equal to or less than 2 cm.

FIG. 2 shows a schematic view from above of a second embodiment of a composite transparent lighting device 20, comprising the transparent element 21 that contains the uniform dispersion of dielectric particles, said element having a perimeter 22, a reflective frame 24 with an external perimeter and an internal perimeter 25, partially overlapping with the transparent element 21 containing the dielectric particles and discrete light sources 23, 23', 23", . . . .

Similar to the embodiment shown in FIG. 1, also in this case it is preferred that no more than 2 cm of the transparent element 21 containing the dielectric particles are lost from an operative point of view, i.e. the overlap of the frame and of the element 21 is equal to or less than 2 cm. For the sake of simplicity frame 24 has been shown as a single element, but it is more convenient that is obtained by joining together a subassembly, i.e. the final frame is obtained by coupling together sub-frames, for example four sub-frames, one for each side of the composite transparent lighting device, this will simplify both the assembly operation, as well as service operation in case one or more discrete devices needs to be replaced.

With regards to the shape of the composite transparent lighting device, this is not limited to any specific shape, square and rectangular shapes (as the one shown in FIGS. 1-3) are preferred, but also circular and oval shapes may be used. The shapes herein mentioned are provided just as non-limiting examples, since any other shape may be successfully adopted.

Although all the embodiments schematically represented show planar systems, this being the preferred configuration, also curved surfaces may be equally employed.

FIG. 3 shows a schematic cross-section view of a third embodiment 30 of a composite transparent lighting device according to the present invention. In this case the transparent element 31 containing the uniform dispersion of dielectric particles is sandwiched between two transparent substrate material 35 and 35'; similarly to the case of FIG. 1, discrete light sources 33 and 33' go within the transparent element 31, and the boundary of the composite transparent lighting device 30 is given by a reflective frame 34 running alongside the perimeter of the device. As already mentioned, frame 34 may be made by the joining of more sub-frames and should provide a suitable thermal dissipation.

The embodiment shown in FIG. 3 is particularly preferred in case of building windows, said kind of windows having two external transparent substrates 35 and 35' providing a thermal insulating action as well as a protective action from ambient agents for the dielectric particles that in some cases may react with moisture or oxygen. In this case a preferred alternative solution according to the embodiment shown in FIG. 3 consists in a thin film deposited on the surface of only one of the glass substrates 35 or 35' assembled maintaining an empty space between said glass substrates filled with inert gasses or dry air. This is especially the case when the composite transparent lighting device is assembled in a hermetically sealed manner and also filled in its empty space with an inert gas.

The invention will be further described with the help of the following non-limiting examples.

EXAMPLE 1

Different Ce:YAG in a silicone matrix dispersions are made. Roll mills are used to disperse commercially available powders of Ce:YAG with sizes comprised between 5 and 10 μm. First the highest concentration sample is made (C1) and then by successive dilution the other samples C2, C3, S1 are made.

A slightly different production process is used for $TiO_2$ and $SiO_2$ sample dispersions. In this case liquid dispersions are made in de-ionized water. Matter densities, 2.2 g/cm$^3$ for $SiO_2$ and 4 g/cm$^3$ for $TiO_2$ have been used. Also in this case the highest concentration sample was first prepared under mild sonication to homogenize the dispersion, and then the lower concentration samples are obtained by means of dilution.

Average dimension for Ce:YAG and $SiO_2$ particles is 7.5 μm, while $TiO_2$ particles were peaked at 0.1 μm, so these values have been used as reference values for the particle size.

The characterizing data (sample ID, material, size, m value at 500 nm, concentration) relative to Ce:YAG samples (C1-C3, S1). $TiO_2$ (C4-C6, S2) and $SiO_2$ (C7-C10, S3) are shown in table 1 below reported:

TABLE 1

| ID | Materials | Particle Size [μm] | $m = n_{particles}/n_{matrix}$ at $\lambda = 500$ nm | Conc (Vol/Vol) |
|---|---|---|---|---|
| C1 | Ce:YAG in | 7.5 | 1.260 | $10^{-2}$ |
| C2 | Silicone | | | $10^{-3}$ |
| C3 | | | | $10^{-4}$ |
| S1 | | | | $10^{-5}$ |
| C4 | SiO$_2$ in Water | 7.5 | 1.095 | $10^{-2}$ |
| C5 | | | | $10^{-3}$ |
| C6 | | | | $10^{-4}$ |
| S2 | | | | $10^{-5}$ |
| C7 | TiO$_2$ in Water | 0.1 | 2.038 | $10^{-3}$ |
| C8 | | | | $10^{-4}$ |
| C9 | | | | $10^{-5}$ |
| C10 | | | | $10^{-6}$ |
| S3 | | | | $10^{-7}$ |

According to the above formula, the concentration ranges for a lighting device according to the present invention with the above reported m values and particle size are shown in table 2 below reported:

TABLE 2

| Materials | Particle Size [μm] | $m = n_{particles}/n_{matrix}$ at $\lambda = 500$ nm | CMin (Vol/Vol) | CMax (Vol/Vol) |
|---|---|---|---|---|
| Ce:YAG | 7.5 | 1.260 | $1.5*10^{-6}$ | $3.75*10^{-5}$ |
| SiO$_2$ | 7.5 | 1.085 | $1.5*10^{-6}$ | $3.75*10^{-5}$ |
| TiO$_2$ | 0.1 | 2.038 | $2*10^{-8}$ | $5*10^{-7}$ |

So it is possible to observe that only samples S1, S2 and S3 have powders concentration within the ranges defined by the present invention, while samples C1-C9 are comparative samples as their particles concentration levels are higher.

EXAMPLE 2

The various samples described in experiment 1 have been characterized in terms of the extinction coefficient over the visible wavelength spectrum by means of a UV-Vis JASCO spectrometer.

The curves for Ce:YAG are shown in FIG. 4, semi-continuous lines L1-L3 indicate the results obtained for comparative samples C1-C3, while dotted line L4 indicates the results obtained with sample S1. In FIG. 4 the target range for the extinction coefficient (i.e. between 0.003 cm$^{-1}$ and 0.03 cm$^{-1}$) is the portion comprised between the two horizontal continuous lines.

Similarly in FIG. 5 are shown the results obtained for comparative sample C4 (semi-continuous line L5), comparative sample C5 (semi-continuous line L6), comparative sample C6 (semi-continuous line L7) and sample S2 (dotted line L8), while FIG. 6 shows the results obtained for comparative sample C7 (semi-continuous line L9), comparative sample C8 (semi-continuous line L10), comparative sample C9 (semi-continuous line L11), comparative sample C10 (semi-continuous line L12) and sample S3 (dotted line L13).

From the experimental data shown in FIGS. 4-6 it is possible to observe that only the samples according to the present invention, S1-S3, guarantee an attenuation coefficient within the visible spectrum comprised between 0.003 cm$^{-1}$ and 0.03 cm$^{-1}$, as shown by experimental dotted data lines L4, L8, L13.

EXAMPLE 3

A 15 cm×15 cm×3 cm sandwiched structure is made with two external glass layers and an intermediate composite layer. The composite layer is made mixing a liquid polyvinyl-butyral precursor with SiO$_2$ spheres with radius peaked at 310 nm. The concentration of SiO$_2$ in matrix is of $5\cdot10^{-6}$ Vol/Vol. The ratio between the refractive index of the dielectric particles and the refractive index of the matrix, called m, is 0.99. The liquid dispersion is deposited on the glass with doctor blading technique and a 0.4 mm thick layer is obtained. The polymerization occurs in situ through UV-curing in N$_2$ environment. Consequently a few micrometer thick layer of liquid dispersion is deposited on the cured layer and the capping glass layer is placed. A second polymerization under same conditions is applied.

To evaluate the property of this assembly in even more stringent conditions with respect to standard use with a standard discrete light source, and for ease of data collection, the reflective frame and discrete light sources are not mounted, but instead the subassembly is irradiated from the right upper portion, with a collimated 450 nm laser with 75 mW power. The output of a recording CCD digital camera is shown in FIG. 7, while FIG. 8 shows the results obtained with a similar sub-assembly without the middle (active) layer. It is possible to observe that in FIG. 8 are visible only two spots in correspondence to the laser beam incoming and outcoming, due to scattering on the panel interfaces/borders, with no recording of further scattering from the panel inner area.

It is possible to observe that even in a single passage with a coherent and collimated light source, in presence of a minimal laser beam attenuation (see previous data on the extinction coefficient) and in presence of a single passage situation (no reflective frame) there is a significant and appreciable amount of scattered light.

Therefore with the sample made according to the present invention it is possible to obtain transparent lighting devices.

The invention claimed is:

1. A composite transparent lighting device comprising a composite transparent element and discrete light sources, said discrete light sources being optically coupled with the composite transparent element perimeter, a reflective frame defining the boundaries of the composite transparent lighting device, said reflective frame being present on at least 80% of the composite transparent lighting device perimeter, wherein:

said composite transparent element comprises a transparent matrix and an uniform dispersion of dielectric particles, the transparent matrix has an optical light extinction coefficient equal or less than 0.009 cm$^{-1}$ evaluated at 500 μm, and a volume concentration of said dielectric particles is comprised between:

$$c_{Max}\left[\frac{Vol}{Vol}\right] = \begin{cases} \left[6\cdot10^{-11.2}\cdot\left[\rho^3\left(\frac{m^2-1}{m^2+2}\right)^2\right]^{-1} & \text{if } 10^{-13} \leq \rho^6\left(\frac{m^2-1}{m^2+2}\right)^2 < 10^{-7} \\ 10^{-5.3}\cdot\rho & \text{if } 10^{-7} \leq \rho^6\left(\frac{m^2-1}{m^2+2}\right)^2 < 10^{10} \end{cases}$$

and

-continued $$c_{Min}\left[\frac{Vol}{Vol}\right] = \begin{cases} \left[6 \cdot 10^{-12.8} \cdot \left[\rho^3 \left(\frac{m^2-1}{m^2+2}\right)^2\right]\right]^{-1} & \text{if } 10^{-13} \leq \rho^6 \left(\frac{m^2-1}{m^2+2}\right)^2 < 10^{-7} \\ 10^{-6.7} \cdot \rho & \text{if } 10^{-7} \leq \rho^6 \left(\frac{m^2-1}{m^2+2}\right)^2 < 10^{10} \end{cases}$$

wherein $\rho$ is the average dielectric particle size expressed in μm, m is the ratio between a refractive index of the dielectric particles and a refractive index of the transparent matrix evaluated at 500 nm, $C_{max}$ is a maximum volume concentration of said dielectric particles, and $C_{min}$ is a minimum volume concentration of said dielectric particles.

2. The composite transparent lighting device according to claim 1, wherein said volume concentration of the dielectric particles is comprised:
   between $10^{-6}$ and $10^{-5}$ if 20 μm>$\rho$≥5 μm,
   between $10^{-6}$ and $10^{-5}$ if 1 μm>$\rho$>0.3 μm or
   between $10^{-4.5}$ and $10^{-3}$ if 0.1 μm>$\rho$>0.04 μm.

3. The composite transparent lighting device according to claim 1, wherein said uniform dispersion of dielectric particles is present within the transparent element.

4. The composite transparent lighting device according to claim 1, wherein said uniform dispersion of dielectric particles is present as an additional layer deposited on a transparent substrate.

5. The composite transparent lighting device according to claim 1, wherein said discrete light sources are within said transparent element and their depth inside the transparent element is equal or less than 2 cm.

6. The composite transparent lighting device according to claim 1, wherein said discrete light sources are external to the transparent element and optically coupled with the transparent element.

7. The composite transparent lighting device according to claim 1, wherein said transparent element has a rectangular or square shape.

8. The composite transparent lighting device according to claim 6, wherein said discrete light sources are optically coupled with at least two opposing sides of the transparent element.

9. The composite transparent lighting device according to claim 1, wherein the number of discrete light sources per unit of length of the transparent element perimeter corresponds to a provided power comprised between 5 and 18 W per meter of length along the device perimeter.

10. The composite transparent lighting device according to claim 1, wherein total light output from the discrete light sources is comprised between 2000 and 5000 lumen per each square meter of composite transparent lighting device surface.

11. The composite transparent lighting device according to claim 1, wherein said discrete light sources comprise LEDs, OLEDs, or OLETs.

* * * * *